United States Patent
Song et al.

(10) Patent No.: US 9,571,836 B2
(45) Date of Patent: Feb. 14, 2017

(54) METHOD AND APPARATUS FOR ENCODING AND DECODING WITH MULTIPLE TRANSFORM COEFFICIENTS SUB-BLOCKS

(71) Applicant: Huawei Technologies Co., Ltd., Shenzhen, Guangdong (CN)

(72) Inventors: Jin Song, Moscow (RU); Mingyuan Yang, Shenzhen (CN); Dong Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 608 days.

(21) Appl. No.: 14/021,782

(22) Filed: Sep. 9, 2013

(65) Prior Publication Data
US 2014/0010312 A1    Jan. 9, 2014

Related U.S. Application Data
(63) Continuation of application No. PCT/CN2011/082597, filed on Nov. 22, 2011.

(30) Foreign Application Priority Data
Mar. 10, 2011    (CN) .......................... 2011 1 0057694

(51) Int. Cl.
    H04N 7/12    (2006.01)
    H04N 19/60   (2014.01)
    (Continued)

(52) U.S. Cl.
    CPC ...... H04N 19/00775 (2013.01); H04N 19/117 (2014.11); H04N 19/645 (2014.11);
    (Continued)

(58) Field of Classification Search
    CPC ............................................... H04N 19/00775
    (Continued)

(56) References Cited

U.S. PATENT DOCUMENTS
8,315,304 B2    11/2012    Lee et al.
2004/0066974 A1  4/2004    Karczewicz et al.
(Continued)

FOREIGN PATENT DOCUMENTS
CA    2687263 A1    12/2008
CN    1741616 A     3/2006
(Continued)

OTHER PUBLICATIONS
International Search Report dated Feb. 23, 2012 in connection with International Patent Application No. PCT/CN2011/082597.
(Continued)

*Primary Examiner* — Richard Torrente
(74) *Attorney, Agent, or Firm* — Huawei Technologies Co., Ltd.

(57) ABSTRACT

An encoding method includes: encoding transform coefficients of a transform coefficient block according to a predetermined scan order, and encoding a set number of transform coefficients in each group until a last group of the transform coefficient block is encoded; storing an obtained map of non-zero transform coefficients, absolute values of transform coefficients, and positive and negative signs of non-zero transform coefficients; when the last group is being encoded, encoding the stored map of non-zero transform coefficients and the map of non-zero transform coefficients encoded in the last group into a bit stream; and encoding the stored absolute values of transform coefficients and positive and negative signs of non-zero transform coefficients and the absolute values of transform coefficients and positive and (Continued)

negative signs of non-zero transform coefficients encoded in the last group into the bit stream.

3 Claims, 3 Drawing Sheets

(51) Int. Cl.
*H04N 19/117* (2014.01)
*H04N 19/645* (2014.01)
*H04N 19/86* (2014.01)
*H04N 19/129* (2014.01)
*H04N 19/61* (2014.01)
*H04N 19/91* (2014.01)
*H04N 19/132* (2014.01)

(52) U.S. Cl.
CPC .......... *H04N 19/86* (2014.11); *H04N 19/129* (2014.11); *H04N 19/132* (2014.11); *H04N 19/61* (2014.11); *H04N 19/91* (2014.11)

(58) Field of Classification Search
USPC ................................................. 375/240.18
See application file for complete search history.

(56) References Cited

U.S. PATENT DOCUMENTS

| | | | |
|---|---|---|---|
| 2004/0095477 A1* | 5/2004 | Maki | G06K 9/3233 348/222.1 |
| 2007/0036223 A1 | 2/2007 | Srinivasan | |
| 2007/0071090 A1 | 3/2007 | Peng et al. | |
| 2007/0285285 A1 | 12/2007 | Puri et al. | |
| 2009/0097568 A1 | 4/2009 | Karczewicz et al. | |
| 2009/0273706 A1* | 11/2009 | Tu | H04N 19/132 348/420.1 |
| 2010/0020867 A1 | 1/2010 | Wiegand et al. | |
| 2013/0070843 A1 | 3/2013 | Srinivasan | |

FOREIGN PATENT DOCUMENTS

| | | |
|---|---|---|
| CN | 001980395 A | 6/2007 |
| CN | 101039430 A | 9/2007 |
| CN | 101938657 A | 1/2011 |
| EP | 2369844 A1 | 9/2011 |
| JP | 2013524707 A | 6/2013 |
| KR | 20050052523 A | 6/2005 |
| KR | 20100072351 A | 6/2010 |
| KR | 20130006678 A | 1/2013 |
| RU | 2335845 C2 | 10/2008 |
| RU | 2008105046 A | 8/2009 |
| RU | 2404534 C2 | 11/2010 |
| WO | 03084076 A1 | 10/2003 |
| WO | 2007079782 A1 | 7/2007 |
| WO | 2008157360 A2 | 12/2008 |
| WO | WO 2010/043809 A1 | 4/2010 |
| WO | 2011128303 A2 | 10/2011 |
| WO | 2012122278 A1 | 9/2012 |

OTHER PUBLICATIONS

Mathias Wien et al, "Description of H.26L Core Experiment on Adaptive Block Transforms", dated Aug. 22-25, 2000, total 4 pages.

Thomas Davies, "Unified scan processing for high efficiency coefficient coding", British Broadcasting Corporation, Joint Collaborative Team on Video Coding (JCT-VC) of ITU-T SG16 WP3 and ISO/IEC JTC1/SC29/WG11, Jan. 20-28, 2011, 18 pages.

J. Sole, at al., "Unified scans for the significance map and coefficient level coding in high coding efficiency", Qualcomm, Joint Collaborative Team on Video Coding (JCT-VC) of ITU-T SG16 WP3 and ISO/IEC JTC1/SC29/WG11, Mar. 16-23, 2011, 16 pages.

"Test Model under Consideration", Joint Collaborative Team on Video Coding (JCT-VC) of ITU-T SG16 WP3 and ISO/IEC JTC1/SC29/WG11, JCTVC-B205, Jul. 21-28, 2010, total 3 pages.

* cited by examiner

| 0  | 1  | 5  | 6  | 14 | 15 | 27 | 28 |
|----|----|----|----|----|----|----|----|
| 2  | 4  | 7  | 13 | 16 | 26 | 29 | 42 |
| 3  | 8  | 12 | 17 | 25 | 30 | 41 | 43 |
| 9  | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG. 1A

| 0  | 1  | 5  | 6  | 16 | 17 | 21 | 22 |
|----|----|----|----|----|----|----|----|
| 2  | 4  | 7  | 12 | 18 | 20 | 23 | 28 |
| 3  | 8  | 11 | 13 | 19 | 24 | 27 | 29 |
| 9  | 10 | 14 | 15 | 25 | 26 | 30 | 31 |
| 32 | 33 | 37 | 38 | 48 | 49 | 53 | 54 |
| 34 | 36 | 39 | 44 | 50 | 52 | 55 | 60 |
| 35 | 40 | 43 | 45 | 51 | 56 | 59 | 61 |
| 41 | 42 | 46 | 47 | 57 | 58 | 62 | 63 |

FIG. 1B

METHOD AND APPARATUS FOR ENCODING AND DECODING WITH MULTIPLE TRANSFORM COEFFICIENTS SUB-BLOCKS

CROSS-REFERENCE TO RELATED APPLICATIONS

This application is a continuation of International Application No. PCT/CN2011/082597 filed on Nov. 22, 2011, which claims priority to Chinese Patent Application No. 201110057694.9, filed on Mar. 10, 2011, both of which are hereby incorporated by reference in their entireties.

TECHNICAL FIELD

The present invention relates to the field of video processing technologies, and in particular, to a method and an apparatus for encoding and decoding transform coefficients.

BACKGROUND

Entropy coding in conventional video coding technologies mainly adopts run-length coding and arithmetic coding. For example, in the H.264 coding standard, a context adaptive variable length coder (Context-based Adaptive Variable Length Coder, CAVLC) and a context adaptive binary arithmetic coder (Context-based Adaptive Binary Arithmetic Coder, CABAC) are used. The two entropy coding modes fully utilize correlation between encoded information and information that needs to be encoded currently. Specifically, a code table or a probability model of information that needs to be encoded currently is built by using the encoded information, which is called context-based entropy coding. Due to using an arithmetic encoding idea, the CABAC has better coding performance than the CAVLC, but increases complexity greatly. Because context information is used, current coding information cannot be encoded until adjacent coding information is encoded completely, while parallel operations cannot be performed. As a result, the entropy coding algorithm becomes a bottleneck in the encoding and decoding. To increase the encoding efficiency, a High Efficiency Video Coding, (HEVC) video coding standard being established, which is a next generation video compression standard, proposes the following arithmetic coding processes:

A. Encode a map of non-zero transform coefficients (significance map). In this step, an entire transform coefficient block that needs to be encoded is encoded in predetermined scan order, which is also called wide-range scan mode, for example, wide-range Z-shaped (zig-zag) mode; the predetermined scan order may also be scan order in wide-range vertical or wide-range horizontal mode, and accordingly, when encoding is performed subsequently in sub-block mode, scan order in narrow-range vertical mode or in narrow-range horizontal mode is used.

In a process of performing step A, each frequency corresponds to a position in a map. When a frequency is 0, the value of a corresponding position in the map is 0; when the frequency is a non-zero value, the value of the corresponding position in the map is 1. In addition, whether a current frequency is a last non-zero frequency is judged. If the current frequency is the last non-zero frequency, the value of the corresponding position is 11 (two is rather than eleven); otherwise, the value of the position is 10 (1 and 0rather than ten). In the process of encoding the map, if 11 appears in the sequence of 0s and is representing the map, it is determined that a transform coefficient block is encoded completely.

B. Encode a map (map) of transform coefficients (coefficients) greater than 1 in sub-block mode. In this step, a map of transform coefficients greater than 1 in the entire transform coefficient block is encoded in predetermined scan order, which is also called narrow-range scan mode, for example, narrow-range zig-zag mode.

C. Encode absolute values of coefficients greater than 1 in sub-block mode by using a narrow-range zig-zag mode.

D. Encode positive and negative signs of non-zero coefficients in sub-block mode and by using a narrow-range zig-zag mode. The foregoing steps B to D are performed on a cyclic basis until all the sub-blocks are encoded completely.

In the foregoing steps, the sub-block mode is defined as follows by using an 8×8 transform coefficient block as an example: An upper left 4×4 transform coefficient block is encoded firstly, followed by an upper right 4×4 transform coefficient block, a lower left 4×4 transform coefficient block, and a lower right 4×4 transform coefficient block. The foregoing 4×4 transform coefficient blocks are sub-blocks of an 8×8 transform coefficient block. The scan order of the wide-range zig-zag mode and the scan order of the narrow-range zig-zag mode are illustrated in FIG. 1A and FIG. 1B respectively, where each small box represents a frequency, and the numbers in the boxes represent the scan order. It is evident that the scan order of the wide-range zig-zag mode and the narrow-range zig-zag mode is based on the same scan rule. For different scanned objects, however, from the perspective of the entire transform coefficient block, the scan order is different between step A of encoding the significance map and step B to step D of encoding absolute values (levels) of transform coefficients and encoding positive and negative signs (signs) of non-zero transform coefficients. Due to different scan order, data needs to be read once respectively in the process of performing step A and performing step B to step D; and two table lookup modes corresponding to the two order types need to be fixed at a decoding end, causing high encoding and decoding overheads and low efficiency. In addition, in step A, if the transform coefficient block is relatively large, which is usually called a large transform unit, for example, a 32×32 significance map, encoding a large significance map causes a heavy burden during hardware designs.

SUMMARY

The technical problem solved by embodiments of the present invention is to provide a method and an apparatus for encoding and decoding transform coefficients to reduce encoding and decoding overheads and increase encoding and decoding efficiency.

A method for encoding transform coefficients includes:

encoding transform coefficients of a transform coefficient block according to a predetermined scan order, and encoding a set number of transform coefficients in each group until a last group of the transform coefficient block is encoded; storing an obtained map of non-zero transform coefficients, absolute values of transform coefficients, and positive and negative signs of non-zero transform coefficients; and when the last group is being encoded, after obtaining a map of non-zero transform coefficients encoded in the last group, encoding the stored map of non-zero transform coefficients and the map of non-zero transform coefficients encoded in the last group into a bit stream; after obtaining absolute values of transform coefficients and positive and negative signs of non-zero transform coefficients encoded in the last group, encoding the stored absolute values of transform coefficients and positive and negative signs of non-zero transform coefficients and the absolute values of transform coefficients and positive and negative signs of non-zero transform coefficients encoded in the last group into the bit stream.

A method for decoding transform coefficients includes:

parsing transform coefficients of a bit stream according to a predetermined scan order to obtain a map of non-zero transform coefficients; and parsing, according to the predetermined scan order, a map of transform coefficients greater than 1, absolute values of transform coefficients greater than 1, and positive and negative signs of non-zero transform coefficients of the bit stream, and parsing a set number of transform coefficients of the bit stream each time.

An apparatus for encoding transform coefficients includes:

an encoding unit, configured to: encode transform coefficients of a transform coefficient block according to a predetermined scan order, and encode a set number of transform coefficients in each group until a last group of the transform coefficient block is encoded; when the last group is being encoded, after obtaining a map of non-zero transform coefficients encoded in the last group, encode a stored map of non-zero transform coefficients and the map of non-zero transform coefficients encoded in the last group into a bit stream; and after obtaining absolute values of transform coefficients and positive and negative signs of non-zero transform coefficients encoded in the last group, encode stored absolute values of transform coefficients and positive and negative signs of non-zero transform coefficients and the absolute values of transform coefficients and positive and negative signs of non-zero transform coefficients encoded in the last group into the bit stream; and a storing unit, configured to store the map of non-zero transform coefficients, absolute values of transform coefficients, and positive and negative signs of non-zero transform coefficients obtained by the encoding unit.

An apparatus for decoding transform coefficients includes:

a decoding unit, configured to parse transform coefficients of a bit stream according to a predetermined scan order to obtain a map of non-zero transform coefficients, parse, according to the predetermined scan order, a map of transform coefficients greater than 1, absolute values of transform coefficients greater than 1, and positive and negative signs of non-zero transform coefficients of the bit stream, and parse a set number of transform coefficients of the bit stream each time.

According to the technical solutions provided in embodiments of the present invention, the scan order of encoding a significance map is the same as the scan order in processes of encoding levels and encoding signs; data needs to be read only once in the encoding process, and a decoding end needs a table lookup mode of only one order type. In addition, the significance map is split into smaller significance maps, which can reduce encoding and decoding overheads and increase encoding and decoding efficiency.

BRIEF DESCRIPTION OF DRAWINGS

To illustrate the technical solutions in the embodiments of the present invention or in the related art more clearly, the following briefly introduces the accompanying drawings required for describing the embodiments or the related art. Apparently, the accompanying drawings in the following description show merely some embodiments of the present invention, and a person of ordinary skill in the art may still derive other drawings from these accompanying drawings without creative efforts.

FIG. 1A is a schematic diagram of wide-range zig-zag scan order;

FIG. 1B is a schematic diagram of narrow-range zig-zag scan order;

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 2:
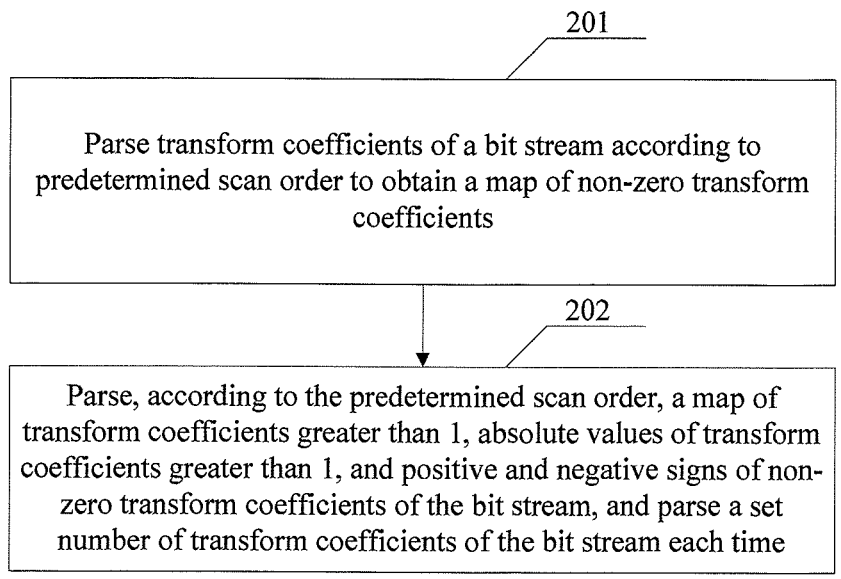
FIG. 2 is a schematic flowchart of a method according to an embodiment of the present invention.

As shown in FIG. 2, a method for encoding transform coefficients includes the following:

201. Encode transform coefficients of a transform coefficient block according to a predetermined scan order, and encode a set number of transform coefficients in each group until a last group of the transform coefficient block is encoded; store an obtained map of non-zero transform coefficients, absolute values of transform coefficients, and positive and negative signs of non-zero transform coefficients.

The transform coefficient block in the embodiment of the present invention may be an 8×8 transform coefficient block, a 32×32 transform coefficient block, or a transform coefficient block of another size. The size of the transform coefficient block does not affect the implementation of the embodiment of the present invention, and the embodiment of the present invention is not limited in this regard.

More specifically, the encoding transform coefficients of a transform coefficient block and encoding a set number of transform coefficients in each group in 201 include: encoding a map of non-zero transform coefficients of a predetermined number of transform coefficients, encoding a map of transform coefficients greater than 1 of the set number of transform coefficients, encoding absolute values of transform coefficients greater than 1 of the set number of transform coefficients, and encoding positive and negative signs of non-zero transform coefficients of a set number of transform coefficients.

The foregoing storage position may be a buffer. The predetermined number of transform coefficients may be determined according to the performance of a processor, the size of the buffer, and the like. Experiments show that better encoding efficiency can be achieved when the predetermined number is 16.

Alternatively, the predetermined scan order may be scan order in wide-range scan mode or scan order in narrow-range scan mode. Examples corresponding to the two types of predetermined scan order are provided in subsequent embodiments of the present invention. It is understandable that the predetermined scan order may also be other order so long as the encoding end corresponds to the decoding end, and the embodiment of the present invention is not limited in this regard.

202. When the last group is being encoded, after a map of non-zero transform coefficients encoded in the last group is obtained, encode the stored map of non-zero transform coefficients and the map of non-zero transform coefficients encoded in the last group into a bit stream; after absolute values of transform coefficients and positive and negative signs of non-zero transform coefficients encoded in the last group are obtained, encode the stored absolute values of transform coefficients and positive and negative signs of non-zero transform coefficients and the absolute values of transform coefficients and positive and negative signs of non-zero transform coefficients encoded in the last group into the bit stream.

According to the technical solution provided in the embodiment of the present invention, the scan order of encoding a significance map is the same as the scan order in processes of encoding levels and encoding signs; data needs to be read only once in the encoding process, and a decoding end needs a table lookup mode of only one order type. In addition, the significance map is split into smaller significance maps, which can reduce encoding and decoding overheads and increase encoding and decoding efficiency.

Figure 3:
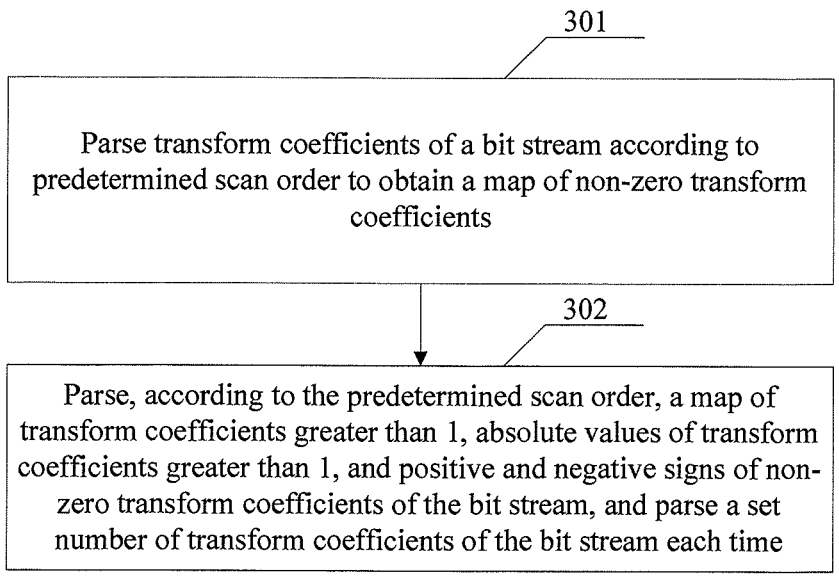
FIG. 3 is a schematic flowchart of a method according to an embodiment of the present invention.

As shown in FIG. 3, a method for decoding transform coefficients includes the following:

301. Parse transform coefficients of a bit stream according to a predetermined scan order to obtain a map of non-zero transform coefficients.

In 301, the predetermined scan order is the same as the predetermined scan order of an encoding end. The scan order may be specified by using a protocol or through negotiation in order to ensure that the encoding end and the decoding end have the same scan order, and the embodiment of the present invention is not limited in this regard.

302. Parse, according to the predetermined scan order, a map of transform coefficients greater than 1, absolute values of transform coefficients greater than 1, and positive and negative signs of non-zero transform coefficients of the bit stream, and parse a set number of transform coefficients of the bit stream each time.

The predetermined scan order may be scan order in wide-range scan mode or scan order in narrow-range scan mode. In this case, the parsing transform coefficients of a bit stream according to a predetermined scan order to obtain a map of non-zero transform coefficients, parsing, according to the predetermined scan order, a map of transform coefficients greater than 1, absolute values of transform coefficients greater than 1, and positive and negative signs of non-zero transform coefficients of the bit stream, and parsing a set number of transform coefficients of the bit stream each time include:

parsing the bit stream according to a scan order in wide-range scan mode to obtain a map of non-zero transform coefficients, parsing, according to the scan order in wide-range scan mode, a map of transform coefficients greater than 1, absolute values of transform coefficients greater than 1, and positive and negative signs of non-zero transform coefficients of the bit stream, and parsing a set number of transform coefficients of the bit stream each time; or parsing the bit stream according to a scan order in narrow-range scan mode to obtain a map of non-zero transform coefficients, and parsing a set number of transform coefficients of the bit stream each time; and parsing, according to the scan order in narrow-range scan mode, a map of transform coefficients greater than 1, absolute values of transform coefficients greater than 1, and positive and negative signs of non-zero transform coefficients of the bit stream, and parsing a set number of transform coefficients of the bit stream each time.

According to the technical solution provided in the embodiment of the present invention, the scan order of encoding a significance map is the same as the scan order in processes of encoding levels and encoding signs; data needs to be read only once in the encoding process, and a decoding end needs a table lookup mode of only one order type. In addition, the significance map is split into smaller significance maps, which can reduce encoding and decoding overheads and increase encoding and decoding efficiency.

In the following embodiments, it is assumed that an 8×8 transform coefficient block is used and that 16 transform coefficients are scanned or parsed each time.

EXAMPLE 1

It is assumed that the predetermined scan order is in wide-range scan mode. If the predetermined scan order is in wide-range Z-shaped (zig-zag) mode, reference may be made to FIG. 1A.

The encoding end performs the following operations in sequence:

(1) Encode a significance map of the first 16 coefficients according to the predetermined scan order of the 8×8 transform coefficient block, and store the encoded significance map in the buffer; encode a map of coefficients greater than 1, absolute values of coefficients greater than 1, and positive and negative signs of the coefficients in sequence, and store obtained levels and signs in the buffer.

(2) Encode a significance map of next 16 coefficients in the scan order according to the predetermined scan order of the 8×8 transform coefficient block, and store the encoded significance map in the buffer; encode a map of coefficients greater than 1, absolute values of coefficients greater than 1, and positive and negative signs of the coefficients in sequence, and store obtained levels and signs in the buffer.

(3) Encode a significance map of next 16 coefficients in the scan order according to the predetermined scan order of the 8×8 transform coefficient block, and store the encoded significance map in the buffer; encode a map of coefficients greater than 1, absolute values of coefficients greater than 1, and positive and negative signs of the coefficients in sequence, and store obtained levels and signs in the buffer.

(4) Encode a significance map of the last 16 coefficients in the scan order according to the predetermined scan order of the 8×8 transform coefficient block, and encode the significance map in the buffer and the obtained significance map of the last 16 coefficients into a bit stream; encode a map of coefficients greater than 1, absolute values of coefficients greater than 1, and positive and negative signs of coefficients in sequence, and encode the level and sign in the buffer and the obtained levels and signs of the last 16 coefficients into the bit stream. After the encoding is completed, the encoding end can send the bit stream to a decoding end. It is understandable that end flag information is obtained when the significance map of the last coefficients is encoded.

The decoding end performs the following operations in sequence:

(1) Read the bit stream, and parse numerical values of the significance map according to the predetermined scan order of the 8×8 transform coefficient block. In this step, numerical values of the significance map of 64 coefficients can be directly parsed.

The code of transform coefficients includes the map of the transform coefficients and numerical values of the transform coefficients, where the numerical values of the transform coefficients include absolute values of the transform coefficients and signs of the transform coefficients; the absolute values of the transform coefficients include a map of transform coefficients greater than 1 (according to this map, non-zero transform coefficients whose absolute values are 1 can be known) and absolute values of transform coefficients greater than 1.

(2) Read the bit stream, and parse, according to the predetermined scan order of the 8×8 transform coefficient block, the map of coefficients greater than 1, absolute values of coefficients greater than 1, and positive and negative signs of all non-zero coefficients of the first 16 coefficients in the scan order.

(3) Read the bit stream, and parse, according to the predetermined scan order of the 8×8 transform coefficient block, the map of coefficients greater than 1, absolute values of coefficients greater than 1, and positive and negative signs of all non-zero coefficients of the next 16 coefficients in the scan order.

(4) Read the bit stream, and parse, according to the predetermined scan order of the 8×8 transform coefficient block, the map of coefficients greater than 1, absolute values of coefficients greater than 1, and positive and negative signs of all non-zero coefficients of the next 16 coefficients in the scan order.

(5) Read the bit stream, and parse, according to the predetermined scan order of the 8×8 transform coefficient block, the map of coefficients greater than 1, absolute values of coefficients greater than 1, and positive and negative signs of all non-zero coefficients of the last 16 coefficients in the scan order.

EXAMPLE 2

It is assumed that the predetermined scan order is in narrow-range scan mode. If the predetermined scan order is in narrow-range Z-shaped (zig-zag) mode, reference may be made to FIG. 1B.

The encoding end performs the following operations in sequence:

1. Take the upper left 4×4 transform coefficient sub-block in a frequency-domain position, encode a significance map according to the predetermined scan order of the 4×4 transform coefficients sub-block, and store the encoded significance map in the buffer; encode a map of coefficients greater than 1, absolute values of coefficients greater than 1, and positive and negative signs of non-zero coefficients in sequence, and store obtained levels and signs in the buffer.

2. Take the upper right 4×4 transform coefficients sub-block in a frequency-domain position, encode a significance map according to the predetermined scan order of the 4×4 transform coefficients sub-block, and store the encoded significance map in the buffer; encode a map of coefficients greater than 1, absolute values of coefficients greater than 1, and positive and negative signs of non-zero coefficients in sequence, and store obtained levels and signs in the buffer.

3. Take the lower left 4×4 transform coefficients sub-block in a frequency-domain position, encode a significance map according to the predetermined scan order of the 4×4 transform coefficients sub-block, and store the encoded significance map in the buffer; encode a map of coefficients greater than 1, absolute values of coefficients greater than 1, and positive and negative signs of non-zero coefficients in sequence, and store obtained levels and signs in the buffer.

4. Take the lower right 4×4 transform coefficients sub-block in a frequency-domain position and encode a significance map according to the predetermined scan order of the 4×4 transform coefficients sub-block; encode the significance map in the buffer and the obtained significance map of the last 16 coefficients (the obtained significance map of the last 16 coefficients includes end information of the map) into a bit stream; encode a map of coefficients greater than 1, absolute values of coefficients greater than 1, and positive and negative signs of non-zero coefficients in sequence, and encode level and sign in the buffer and the obtained levels and signs of the last 16 coefficients into the bit stream.

The decoding end performs the following operations in sequence:

(1) Read the bit stream; parse numerical values of the significance map of the first 16 transform coefficients sub-block according to the predetermined scan order of 4×4 transform coefficients sub-block, and store the numerical values in an upper left sub-block of the map; parse numerical values of the significance map of next 16 transform coefficients sub-block according to the predetermined scan order of 4×4 transform coefficients sub-block, and store the numerical values in an upper right sub-block of the map; parse numerical values of the significance map of next 16 transform coefficients sub-block according to the predetermined scan order of 4×4 transform coefficients sub-block, and store the numerical values in a lower left sub-block of the map; and parse numerical values of the significance map of the last 16 transform coefficients sub-block according to the predetermined scan order of 4×4 transform coefficients sub-block, and store the numerical values in a lower right sub-block of the map.

(2) Read the bit stream, and parse, according to the predetermined scan order of the 4×4 transform coefficients sub-block, the map of coefficients greater than 1, absolute values of coefficients greater than 1, and positive and negative signs of all non-zero coefficients of the first 16 coefficients, and use the results as coefficients in the position of the upper left sub-block.

(3) Read the bit stream, and parse, according to the predetermined scan order of the 4×4 transform coefficients sub-block, the map of coefficients greater than 1, absolute values of coefficients greater than 1, and positive and negative signs of all non-zero coefficients of next 16 coefficients, and use the results as coefficients in the position of the upper right sub-block.

(4) Read the bit stream, and parse, according to the predetermined scan order of the 4×4 transform coefficients sub-block, the map of coefficients greater than 1, absolute values of coefficients greater than 1, and positive and negative signs of all non-zero coefficients of next 16 coefficients, and use the results as coefficients in the position of the lower left sub-block.

(5) Read the bit stream, and parse, according to the predetermined scan order of the 4×4 transform coefficients sub-block, the map of coefficients greater than 1, absolute values of coefficients greater than 1, and positive and negative signs of all non-zero coefficients of the last 16 coefficients, and use the results as coefficients in the position of the lower right sub-block.

Figure 4:
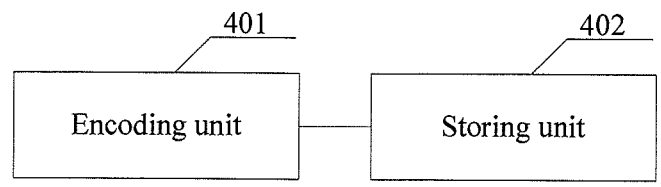
FIG. 4 is a schematic structural diagram of an encoding apparatus according to an embodiment of the present invention.

As shown in FIG. 4, an apparatus for encoding transform coefficients includes:

an encoding unit 401, configured to: encode transform coefficients of a transform coefficient block according to a predetermined scan order, and encode a set number of transform coefficients in each group until a last group of the transform coefficient block is encoded; when the last group is being encoded, after obtaining a map of non-zero transform coefficients encoded in the last group, encode a stored map of non-zero transform coefficients and the map of non-zero transform coefficients encoded in the last group into a bit stream; and after obtaining absolute values of transform coefficients and positive and negative signs of non-zero transform coefficients encoded in the last group, encode stored absolute values of transform coefficients and positive and negative signs of non-zero transform coefficients and the absolute values of transform coefficients and positive and negative signs of non-zero transform coefficients encoded in the last group into the bit stream; and a storing unit 402, configured to store the map of non-zero transform coefficients, absolute values of transform coefficients, and positive and negative signs of non-zero transform coefficients obtained by the encoding unit.

Alternatively, the encoding unit 401 being configured to encode transform coefficients of a transform coefficient block according to a predetermined scan order includes:

encoding transform coefficients of the transform coefficient block according to a scan order in wide-range scan mode; or encoding transform coefficients of the transform coefficient block according to a scan order in narrow-range scan mode.

According to the technical solution provided in the embodiment of the present invention, the scan order of encoding a significance map is the same as the scan order in processes of encoding levels and encoding signs; data needs to be read only once in the encoding process, and a decoding end needs a table lookup mode of only one order type. In addition, the significance map is split into smaller significance maps, which can reduce encoding and decoding overheads and increase encoding and decoding efficiency.

Figure 5:
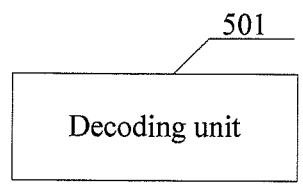
FIG. 5 is a schematic structural diagram of a decoding apparatus according to an embodiment of the present invention.

As shown in FIG. 5, an apparatus for decoding transform coefficients includes:

a decoding unit 501, configured to parse transform coefficients of a bit stream according to a predetermined scan order to obtain a map of non-zero transform coefficients, parse, according to the predetermined scan order, a map of transform coefficients greater than 1, absolute values of transform coefficients greater than 1, and positive and negative signs of non-zero transform coefficients of the bit stream, and parse a set number of transform coefficients of the bit stream each time.

Alternatively, the decoding unit 501 is specifically configured to: parse the bit stream according to a scan order in wide-range scan mode to obtain a map of non-zero transform coefficients, parse, according to the scan order in wide-range scan mode, a map of transform coefficients greater than 1, absolute values of transform coefficients greater than 1, and positive and negative signs of non-zero transform coefficients of the bit stream, and parse a set number of transform coefficients of the bit stream each time; or the decoding unit 501 is specifically configured to:

parse the bit stream according to a scan order in narrow-range scan mode to obtain a map of non-zero transform coefficients, and parse a set number of transform coefficients of the bit stream each time; and parse, according to the scan order in narrow-range scan mode, a map of transform coefficients greater than 1, absolute values of transform coefficients greater than 1, and positive and negative signs of non-zero transform coefficients of the bit stream, and parse a set number of transform coefficients of the bit stream each time.

According to the technical solution provided in the embodiment of the present invention, the scan order of encoding a significance map is the same as the scan order in processes of encoding levels and encoding signs; data needs to be read only once in the encoding process, and a decoding end needs a table lookup mode of only one order type. In addition, the significance map is split into smaller significance maps, which can reduce encoding and decoding overheads and increase encoding and decoding efficiency.

It is understandable to persons of ordinary skill in the art that all or part of the steps in the methods provided in the foregoing embodiments may be performed by hardware instructed by a program. The program may be stored in a computer readable storage medium, such as a read-only memory, a magnetic disk, and a CD-ROM.

The technology provided in the embodiments of the present invention can be applied in the field of digital signal processing and is implemented by using an encoder and a decoder. Video encoders and decoders are widely applied in various communications devices or electronic devices, for example, a digital television, a set-top box, a media gateway, a mobile phone, a wireless device, a personal digital assistant (PDA), a handheld or portable computer, a GPS receiver/navigator, a camera, a video player, a video camera, a video recorder, a surveillance device, a videoconferencing and videophone device, and the like. Such devices include a processor, a memory, and interfaces for data transmission. The video encoder and decoder can be directly implemented by using a digital circuit or a chip, for example, a DSP (digital signal processor), or by using a processor driven by software codes to perform processes in the software codes.

Detailed above are a method and an apparatus for encoding and decoding transform coefficients according to the embodiments of the present invention. Although the principle and implementation of the present invention are described with reference to exemplary embodiments, the embodiments are only intended to help understand the method and core idea of the present invention. In addition, with respect to the implementation and applicability of the present invention, modifications and variations may be made by persons of ordinary skill in the art according to the idea of the present invention. Therefore, the specification shall not be construed as a limitation on the present invention.

What is claimed is:

1. A method for encoding transform coefficients, wherein a transform coefficient block comprises a plurality of sub-blocks, and each sub-block is in a fixed size with a set number of transform coefficients, the method comprising:

encoding the transform coefficients in each sub-block according to a same predetermined order until the last sub-block of the transform coefficient block is encoded;

for each sub-block, storing a map of non-zero transform coefficients, absolute values of the transform coefficients, and positive or negative signs of the non-zero transform coefficients obtained through the encoding, wherein the map of non-zero transform coefficients, the absolute values of the transform coefficients, and the positive or negative signs of the non-zero transform coefficients are all obtained according to the same predetermined order; and when the last sub-block is being encoded, after obtaining a map of non-zero transform coefficients of the last sub-block, encoding the stored maps of non-zero transform coefficients of previously encoded sub-blocks and the map of non-zero transform coefficients of the last sub-block into a bit stream; and after obtaining the absolute values of the transform coefficients and the positive or negative signs of the non-zero transform coefficients of the last sub-block, encoding the stored absolute values of transform coefficients and positive or negative signs of the non-zero transform coefficients of the previously encoded sub-blocks and the absolute values of the transform coefficients and positive or negative signs of the non-zero transform coefficients of the last sub-block into the bit stream;

wherein the predetermined order is a scan order in a narrow-range scan mode, and wherein the size of the sub-blocks is 4×4 with the set number of 16 transform coefficients.

2. The method according to claim 1, wherein encoding the transform coefficients in each sub-block comprises:

encoding a map of non-zero transform coefficients of the set number of transform coefficients, encoding a map of transform coefficients that are greater than 1 of the set number of transform coefficients, encoding absolute values of transform coefficients that are greater than 1 of the set number of transform coefficients, and encoding positive or negative signs of non-zero transform coefficients of the set number of transform coefficients.

3. A method for decoding transform coefficients comprising:

parsing a bit stream of transform coefficients according to a predetermined order to obtain a map of non-zero transform coefficients; and parsing, according to the predetermined order, a map of transform coefficients that are greater than 1, absolute values of transform coefficients that are greater than 1, and positive or negative signs of non-zero transform coefficients, and parsing a set number of transform coefficients of the bit stream each time according to the same predetermined order until all transform coefficients of a transform coefficient block in the bit stream are parsed;

wherein the predetermined order is a scan order in a narrow-range scan mode, wherein the transform coefficient block comprises a plurality of sub-blocks, and each sub-block comprises the set number of transform coefficients, and wherein the set number is 16.

* * * * *